(No Model.)

P. E. SHEE.
CUTTER BAR FOR MOWING AND REAPING MACHINES.

No. 370,497. Patented Sept. 27, 1887.

WITNESSES:
P. F. Nagle
H. W. Han. Powel

INVENTOR
Parke E. Shee
by his attorney
Francis T. Chambers

N. PETERS, Photo-Lithographer, Washington, D. C.

UNITED STATES PATENT OFFICE.

PARKE E. SHEE, OF CHESTER, ASSIGNOR OF ONE-HALF TO ROBERT W. MARTIN, OF PHILADELPHIA, PENNSYLVANIA.

CUTTER-BAR FOR MOWING AND REAPING MACHINES.

SPECIFICATION forming part of Letters Patent No. 370,497, dated September 27, 1887.

Application filed February 26, 1887. Serial No. 229,005. (No model.)

*To all whom it may concern:*

Be it known that I, PARKE E. SHEE, of Chester, Delaware county, State of Pennsylvania, have invented a new and useful Improvement in Cutter-Bars for Mowing and Reaping Machines, of which the following is a true and exact description, due reference being had to the accompanying drawings, which form a part of this specification.

My invention relates to the construction of the cutter-bar of mowing and reaping machines, and has for its object to enable the cutters of the bar to be readily removed and inserted, so that broken knives can be withdrawn and replaced by new ones while the machine is in use, and also so that the cutters can be taken out for sharpening and replaced without the use of tools or the need of skilled workmen.

My invention consists in forming my cutter-bar so that the cutters are secured to it by their shanks entering sockets in said cutter-bar, and being held there by spring-latches secured upon the outside of the cutter-bar; and it further consists of the particular arrangement and combination of devices, hereinafter fully described, and particularly pointed out as my invention in the claims.

Figure 1:
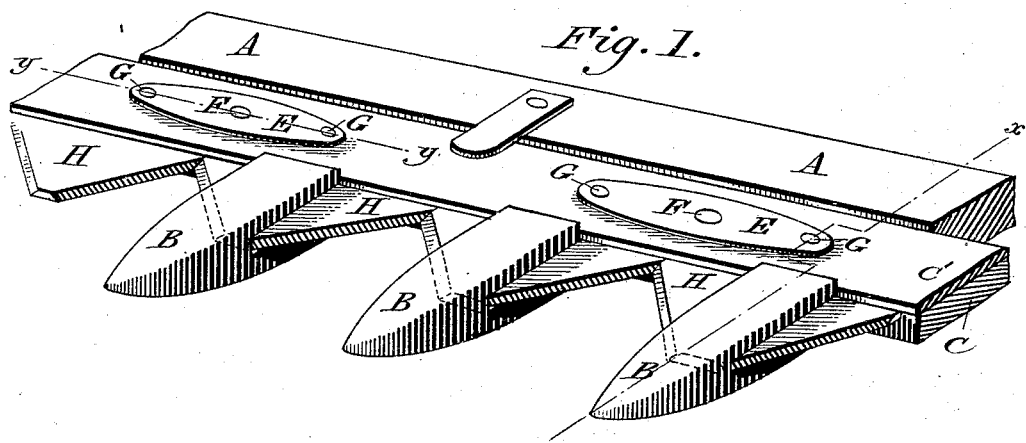
Figure 2:
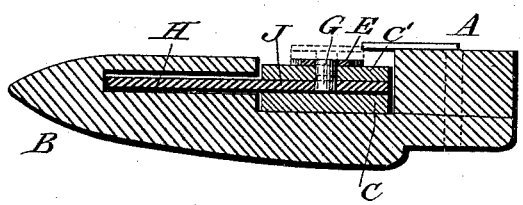
Figure 3:
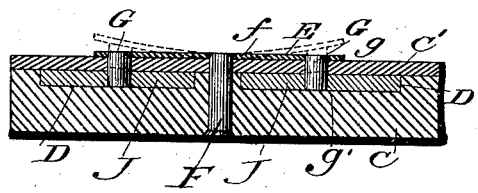
Figure 4:
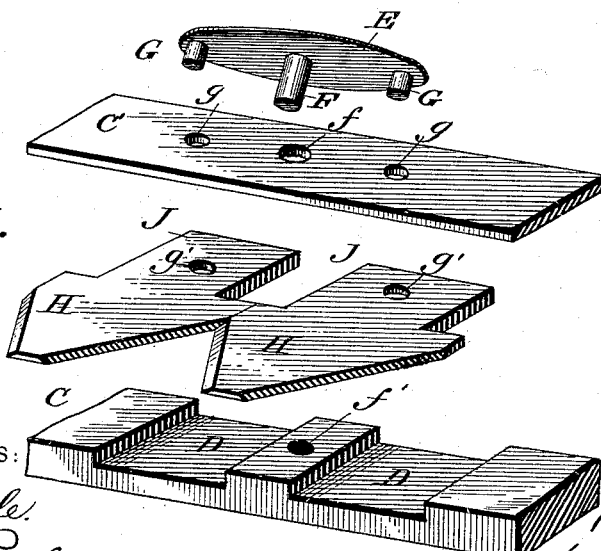

Reference being now had to the drawings, which illustrate the construction of a cutter-bar and its cutters made in accordance with my invention, Figure 1 is a perspective view of my improved cutter-bar in connection with the ordinary finger-bar; Fig. 2, a section through the finger-bar, cutter, and cutter-bar on the line $x\ x$ of Fig. 1. Fig. 3 is a section, on an enlarged scale, through the cutter-bar and cutters on the line $y\ y$ of Fig. 1; and Fig. 4 shows the various parts of the cutter-bar and cutters in perspective.

A is a finger-bar; B B, &c., fingers.

C C' is the cutter-bar, made in two pieces, the lower one, C, having recesses or sockets D cut out of its upper face, and covered by the upper strip, C'.

E E are springs secured on the top of bar C' by rivets F, which pass through holes $f\ f'$ in bars C' and C, and serve also to secure the said bars together. On each end of the spring F are pins G, which pass through holes $g$ in bar C' and rest against the bottom of the recess D when the springs E are in their normal flat position on the top of bar C'.

H H are the ordinary cutters of the cutter-bar. They are provided with shanks J, which fit in the recesses D, and have holes $g'$, which register with the holes $g$ when the cutters are in proper position on the cutter-bar, and into which the pins G pass, thus securing the cutters firmly in place.

When it is desired to remove a cutter for any purpose, it is only necessary to elevate the end of the spring having the pin G attached, which holds the cutter in the bar, and the cutter can then be removed and another inserted, if desired, the whole operation requiring but a few moments and being as readily performed in the field as in a shop.

While I believe the details of construction shown in the drawings to be the best, I do not wish to be understood as limiting my invention upon these details, save where they are especially referred to in the claims. Thus an independent spring may be employed for each latch-pin G, and the spring may be secured upon the outside of the cutter-bar in any convenient way. The form of the cutter-shanks J and sockets D may of course be varied, and the socket might even be formed in a solid cutter-bar by punching or boring instead of being formed, as shown, between two bars, which, riveted together, form the cutter-bar. Of course screws could be used instead of the rivets F for the same purpose.

Having now described my invention, what I claim as new, and desire to secure by Letters Patent, is—

1. In combination with a cutter-bar having sockets formed in it for the shanks of the cutters and a hole leading from its outer surface into each socket, springs secured on the outside of the cutter-bar and having each a latch-pin passing through the hole in the cutter-bar into the socket, and cutters having shanks adapted to fit in the sockets in the cutter-bar, each of said shanks having a perforation adapted to register with the corresponding hole in the cutter-bar and receive the spring latch-pin when the cutter is in proper position, all substantially as and for the purpose specified.

2. In combination with a cutter-bar having sockets formed therein for the reception of the shanks of cutters and having holes passing from the outside of the cutter-bar into the sockets, springs secured at their middle to the cutter-bar at points midway between each alternate pair of sockets, said springs having at each end pins which project through the holes in the cutter-bar into the sockets, and cutters having shanks adapted to fit into the sockets, formed in the cutter-bar, said shanks having perforations which register with the holes in the cutter-bar and receive the spring latch-pins when the cutters are in proper position, all substantially as and for the purpose specified.

3. In a cutter-bar adapted for use with removable cutters, substantially as specified, the combination of the bar C, having sockets D, the bar C', having perforations $g$, the springs E, having latch-pins G, and the rivet or screw F, securing the spring E and bars C C' together and in place, substantially as described.

PARKE E. SHEE.

Witnesses:
 LISLE STOKES,
 JOSHUA MATLACK, Jr.